July 29, 1969     C. E. WAKEFIELD, JR     3,457,932
METHOD FOR INJECTING A CLEANING PIG INTO A FLOW LINE
Filed Aug. 17, 1966     2 Sheets-Sheet 1
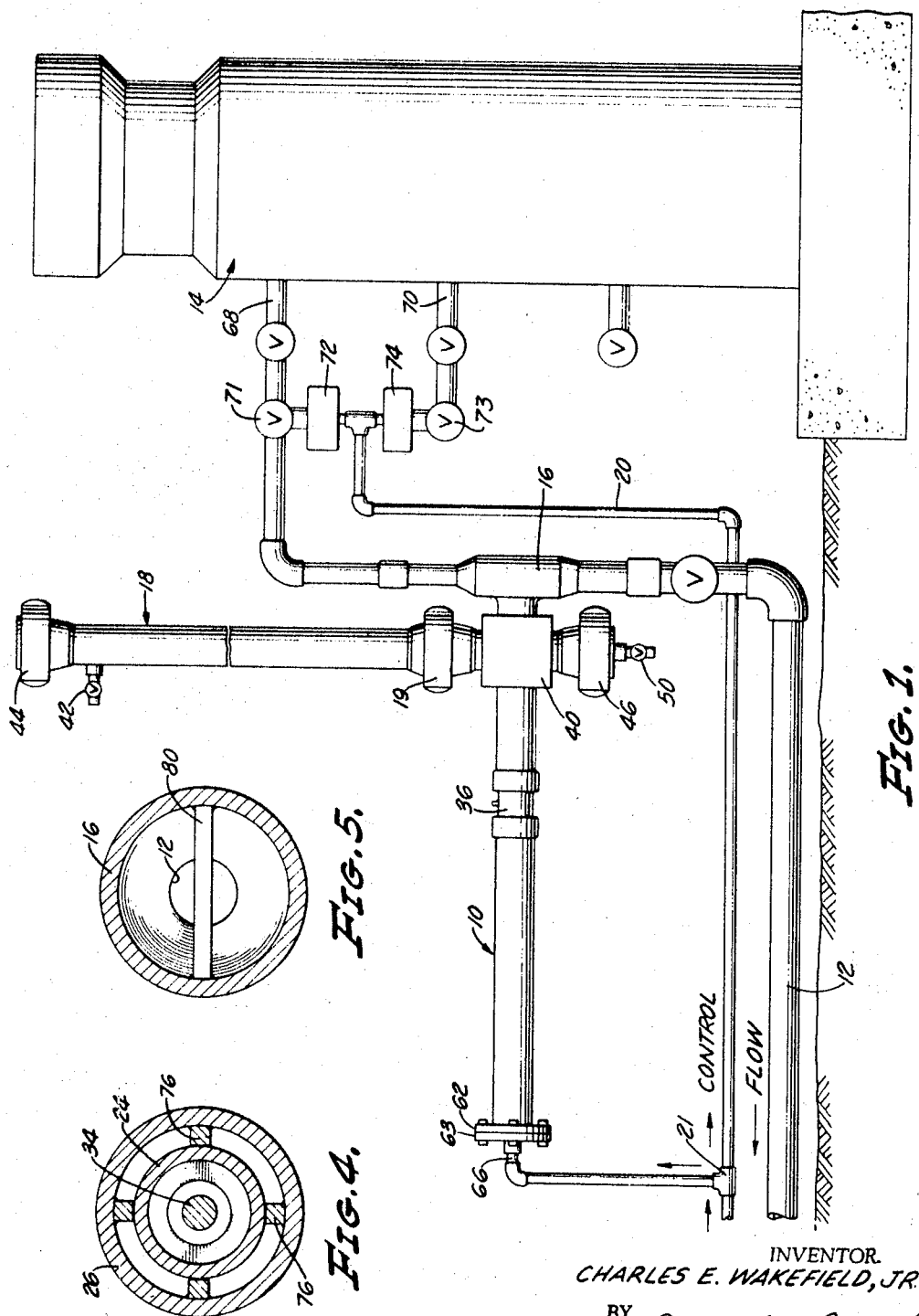
INVENTOR.
CHARLES E. WAKEFIELD, JR.
BY
Donald W Canady
ATTORNEY

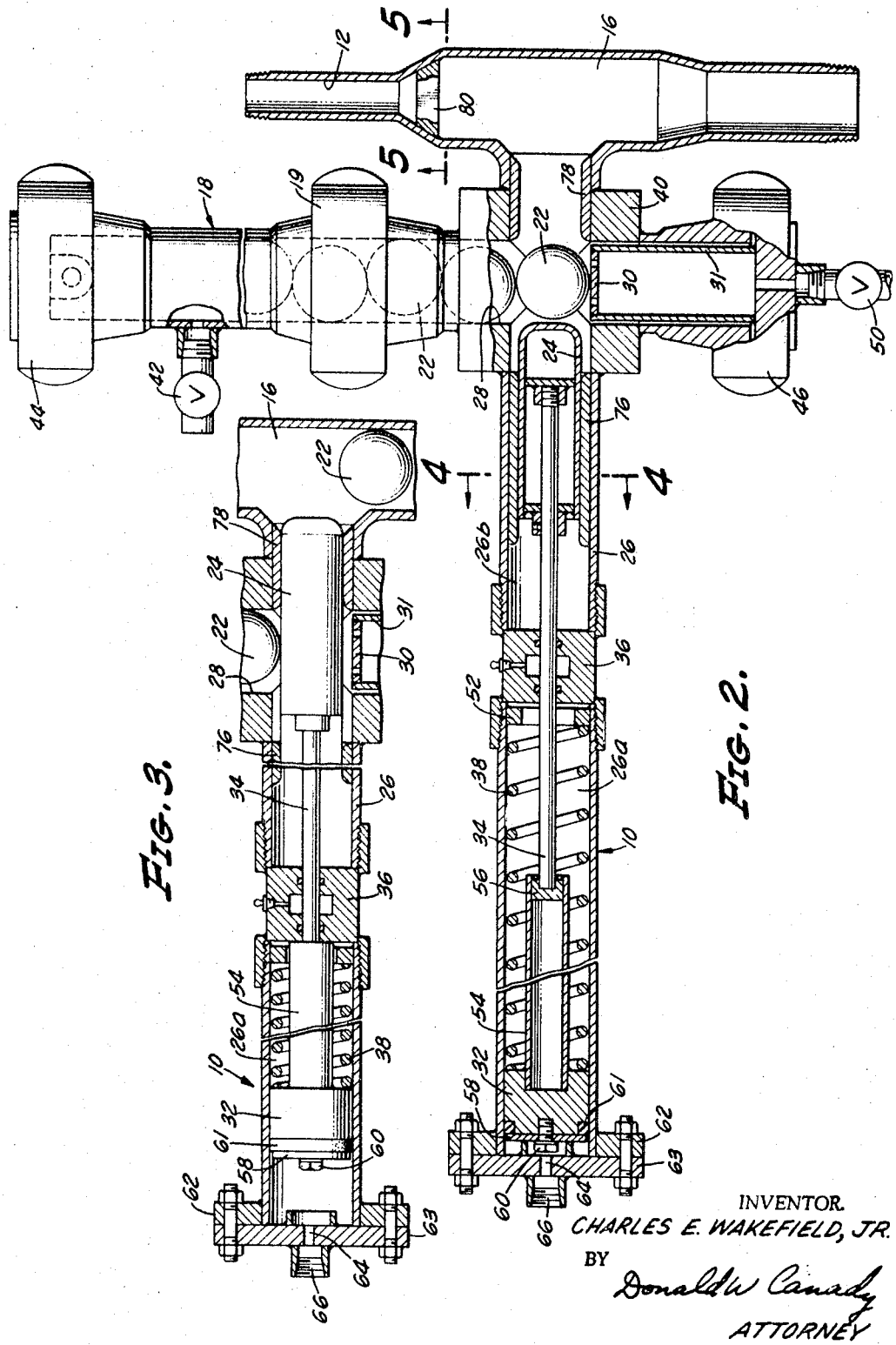

United States Patent Office 3,457,932
Patented July 29, 1969

3,457,932
METHOD FOR INJECTING A CLEANING PIG INTO A FLOW LINE
Charles E. Wakefield, Jr., Long Beach, Calif., assignor to Atlantic Richfield Company, Philadelphia, Pa., a corporation of Pennsylvania
Continuation-in-part of application Ser. No. 350,208, Mar. 9, 1964. This application Aug. 17, 1966, Ser. No. 573,095
Int. Cl. E03b 1/00; B08b 1/00
U.S. Cl. 137—12                                 4 Claims

ABSTRACT OF THE DISCLOSURE

This application describes a method for controlling the injection of cleaning pigs into a flow line at a remotely located well head having control valves thereon which are held open by fluid pressure, by utilizing the valve control fluid to simultaneously operate the pig injector.

---

This is a continuation-in-part of my copending application Ser. No. 350,208 filed Mar. 9, 1964 now Patent No. 3,291,217 for "Flow Line Pig Injector."

My present invention relates to a method for cleaning pipes internally and, more particularly, relates to a method for injecting a cleaning "pig" into a pipeline to remove the accumulation of materials which tend to restrict the flow of fluids through the pipeline.

The accumulation of waxes, asphaltines, ice and scale in flow lines used to transport oil and gas from production wells tends to restrict flow through such lines. Various chemical, mechanical and heating methods have been proposed for removing such deposits from the internal surfaces of such flow lines and other pipes, tubing and the like. The present invention relates generally to the mechanical method for removing such deposits with a cleaning pig which is inserted into a pipe, flow line, pipeline, or the like and forced through the line by the fluid normally flowing therethrough to thereby clear the pipe of the aforementioned restrictions.

This invention in one of its more specific embodiments is concerned with providing a method for injecting a pig into a flow line at or near the wellhead of an underwater oil well. The embodiment of my present invention described herein relates to offshore operations; however, my present invention may also be utilized for onshore oil and gas operations and for removing internal deposits in pipes and tubes generally.

The pig utilized in my present invention may be of any resilient material which is resistant to swelling upon contact with well fluids or moisture. Generally, the shape of the pig should conform to the cross section or configuration of the flow line to be cleaned and preferably is either spherical or cylindrical.

The cleaning pigs have been manually injected into the flow lines; however, excessive labor is encountered in cleaning flow lines with manually injected pigs when the wells are widely separated or are remotely located such as in underwater well sites. On the other hand, certain wells because of their inaccessibility have not previously been considered amenable to pig cleaning.

It is therefore an object of my present invention to provide an improved hydraulic method for injecting a cleaning pig into a pipe.

It is also an object of my present invention to provide a method for remotely injecting a cleaning pig into a pipe with fluid pressure.

Other objects and a more complete understanding of my present invention may be had by reference to the following specification and the appended claims when taken in conjunction with the accompanying drawings, wherein:

FIG. 1 shows in elevation a device installed on a flow line at a wellhead for practicing my present invention;
FIG. 2 is an enlarged cross-sectional elevation of the pig injector mechanism shown in FIG. 1;
FIG. 3 shows in cross-sectional elevation the pig injector mechanism with the fluid driven piston injecting a pig;
FIG. 4 is a sectional view taken on line 4—4 of FIG. 2 showing the injector barrel with the plunger mechanism therein; and
FIG. 5 is a sectional view taken on line 5—5 showing the T.

With reference to the drawings generally, the pig injector 10 is installed on the flow line 12 near the production wellhead 14 so that cleaning pigs may be injected into the flow line through a T 16. A cleaning pig from the pig storage chamber 18 is injected by remote hydraulic manipulation of pig injector 10, into the flow line 12 where the pig is moved by the flow of well fluids through the flow line 12 to remove the accumulation of deposits therein.

Referring more particularly to the drawings, a pig injector mechanism 10 with suitable pig storage means 18 is attached to the flow line 12 with a suitable T 16 to facilitate the injection of pigs into the flow line. An injector body 40 is attached to the flow line T through which cleaning pigs may be injected into the flow line, as will hereinafter be described. The storage chamber 18 is positioned on top of the injector body 40 at an opening 28 to permit pigs stored in storage chamber 18 to drop into the injector body 40. The storage chamber 18 is equipped with a coupling 19 which permits removal of the storage chamber 18 for access to the injector body 40 through the opening 28 therein. Pigs may be loaded into the storage chamber 18 by first relieving the pressure in the chamber through bleed-off valves 42 and 50 and then removing the coupling 44 at the top of the storage chamber 18. The couplings 19, 44 and 46 may be of any readily releasable type such as a unibolt coupling. The lower surface 30 of the injector body may be removable with cap 31 which is removably connected to the injector body with coupling 46. The pressure in the injector body is bled off from surface 30 through valve 50.

The pig is larger than the flow line 12 through which it is forced to thus be effective in dislodging accumulations in the line. The diameter of the T 16, however, is slightly larger than that of the pig 22 to facilitate injection of the pig into the flow line from the injector body 40. Spacer bar 80 is provided in the flow line T 16 through which the pig 22 passes into the flow line, to prevent plugging the flow line with the pig in the event of backflow.

An injector barrel 26 is connected to the injector body 40 and houses the injector mechanism used to drive a plunger 24 through the injector body to force a cleaning pig from the injector body into the flow line through T 16. The injector barrel 26 is preferably formed in two parts as best viewed in FIG. 2, in order to separate the pressure in the plunger section 26b from the pressure in the cylinder section 26a. Plunger 24 is connected to the piston 32 which supplies the driving force for the plunger, through the rod 34 which is connected at one end to plunger 24 and at the other end to piston 32, as shown in FIG. 2. The injector barrel 26b and the injector body through which the plunger is driven are equipped with diametrically spaced guides 76 and 78 to center and guide the plunger 24 through the injector body. A packing gland 36 through which rod 34 is slidable, provides a seal between the plunger section 26b and the cylinder section 26a of the injector barrel 26. The rod 34 may be connected directly to the piston 32, although I prefer to use an enlarged rod section or a pipe member 54 with a rod socket 56 to make the rod 30 more rigid. The piston 32 has a backing plate 58 connected thereto with bolt 60 to hold packing 61 in the piston groove. A flange member 62 is provided at the end of the injector barrel to which blind flange 63 is bolted to close off the barrel. Blind flange 63 has a port 64 therein for receiving hydraulic fluid through line 66.

A stop ring 52 is connected fixedly within the cylinder section 26a and a spring 38 biased between the stop ring 52 and the piston 32, as shown in FIG. 2.

Wellhead 14 may be any of the conventional type wellheads with a tubing outlet 68 and a casing outlet 70, both of which may be equipped with hydraulically actuated safety valves 71 and 73, respectively. These safety valves may be of the type that are held open by conventional hydraulic actuators 72 and 74 with hydraulic pressure supplied to the actuators through a hydraulic control line 20, permitting remote control of the valves. One conventional actuator useful for this purpose is the Robotarm Actuator, manufactured by the Bettis Corporation of Houston, Tex. The valves 71 ad 73 are conventional plug-type valves which are held open by hydraulic pressure applied against a spring-biased piston. When the hydraulic pressure in line 20 is released the spring moves the piston which in turn rotates valve 71 to its closed position. In one embodiment of my present invention, the hydraulic control fluid used to hold the tubing and/or casing valves open is utilized to pressurize piston 32 in the injector barrel 26. In this embodiment, control fluid pressure manipulation actuates simultaneously both wellhead apparatus, such as a flow line control valve, and the ejector, as will be hereinafter described. Thus, the control fluid line 20 is provided with a suitable T 21 so that hydraulic fluid can be supplied through line 66 to the injector barrel 26.

Although the apparatus shown in FIG. 1 is described in connection with a wellhead of the type described in my copending application Ser. No. 100,411, filed Apr. 16, 1961 now Patent No. 3,279,536, it is apparent that the apparatus shown in FIG. 1 can be utilized with any wellhead where the tubing outlet is provided with a hydraulically controlled safety valve, or could be utilized without reference to the wellhead on any type of line which it is desired to clean by supplying hydraulic fluid to the injector barrel 26 to drive the piston 32.

During normal production, the piston 32 is driven to the right by fluid pressure exerted through injector barrel hose 66, and the position of the plunger 24 is as shown in FIG. 3 with the plunger blocking the opening 28 in the injector body so that a cleaning pig cannot pass from the storage chamber 18 through opening 28 into the injector body 40. Thus, fluid pressure is normally maintained on piston 32 to hold plunger 24 in the position shown in FIG. 3. Such pressure on the piston compresses the spring 38 between the piston 32 and the stop ring 52. When it is desired to inject a pig into the flow line, the fluid pressure exerted through hose 66 on piston 32 is released momentarily and the spring 38 drives piston 32 to the left to thereby retract the plunger 24 from opening 28 to the position shown in FIG. 2. Releasing the fluid pressure also closes the flow line control valves since it is operated conjointly with the pig ejector by using a common control fluid as shown in FIG. 1. With the plunger 24 in the retracted position shown in FIG. 2, a cleaning pig 22 drops from the storage chamber 18 through injector body opening 28, into the injector body 40, as shown in FIG. 2. When the pressure is again exerted against the piston 32, the plunger 24 is advanced to its normal operating position, as shown in FIG. 3, and forces a pig into the flow line through T 16, at the same time reopening the flow line control valves 71 and 73.

I claim:

1. A method for injecting a cleaning pig into a flow line arranged to receive flow from an underwater well through a wellhead having a valve in said flow line adapted for actuation with a control fluid, and wherein said pig is ejected through an ejector barrel communicating with said flow line and having a pig storage chamber thereon feeding pigs one at a time into said barrel through an opening in said chamber, said ejector barrel having a cylinder section and a plunger section, and said ejector barrel having therein a plunger means in said plunger section and a spring biased piston in said cylinder section operatively connected to said plunger means, comprising the step of:

providing pressurized said control fluid in said cylinder section to said piston to drive said piston against said spring bias means to cause said plunger to cover said pig storage chamber opening and prevent pigs from falling into said barrel, periodically closing said valve by releasing said control fluid pressure whereby said spring bias retracts said piston and said plunger means so that a pig passes through said opening into said ejector barrel, and repressurizing said cylinder section with control fluid pressure to drive said piston and move said plunger means into position to eject said pig into said flow line and in said ejecting position prevent additional pigs from entering said ejector barrel from said pig storage chamber through said opening, said repressurizing of said control fluid simultaneously reopening said valve to permit fluid flow from said wellhead into said flow line to force said pig through said flow line.

2. A method for injecting a cleaning pig into a flow line arranged to receive flow from an underwater wellhead apparatus wherein a valve positioned in the flow line and adapted for actuation with a control fluid is normally held open by pressure on said fluid and wherein a pig injector barrel having a cylinder section is in fluid communication with said control fluid and a plunger section is in communication with said flow line, comprising the steps of:

releasing said control fluid pressure to close said flow line valve and move a piston in said cylinder section to advance a pig in said plunger section of said barrel, reapplying pressure to said control fluid to reopen said valve, and simultaneously eject said pig from said barrel into said flow line.

3. A method for injecting a cleaning pig into a flow line arranged to receive flow from an underwater well through a wellhead apparatus having a valve in said flow line adapted for actuation with a control fluid, and wherein said pig is ejected through an injector arrel having a cylinder section and a plunger section, said plunger section communicating with said flow line and having a pig storage chamber thereon feeding pigs one at a time into said plunger section through an opening in said chamber, said barrel having therein plunger means in said plunger section and a spring bias piston in said cylinder section operatively connected to said plunger means and in fluid communication with said control fluid whereby said piston and plunger means are moved by said control fluid pressure, comprising the following steps:

releasing the pressure on said control fluid to close said valve and permit said spring bias to retract said piston and said plunger means from a position in which said plunger means prevents pigs from entering said barrel so that a pig passes through said opening from said pig storage chamber into said injector barrel, and reapplying pressure to said control fluid to reopen said flow line valve and move said plunger means to eject said pig into said flow line and block said chamber opening to prevent additional pigs from entering said ejector barrel from said pig storage chamber.

4. A method for injecting a cleaning pig into a flow line arranged to receive flow from an underwater well through a wellhead, said wellhead having apparatus adapted for actuation with a control fluid and wherein said pig is ejected through an injector barrel into said flow line, said barrel having a cylinder section, a plunger section, and a pig storage chamber with an opening through which a pig may be discharged from said storage chamber into said plunger section, and wherein a piston in said cylinder section is adapted for simultaneous actuation with wellhead apparatus control fluid, the steps comprising:
  releasing said pressure on said wellhead apparatus control fluid,
  simultaneously releasing the pressure on said piston to move said plunger to such a position that a pig may move from said pig storage chamber into said barrel, and
  reapplying pressure to said control fluid and simultaneously reapplying fluid pressure to said piston to move said plunger to eject said pig from said barrel into said flow line and block additional pigs from moving from said pig storage chamber into said barrel.

References Cited

UNITED STATES PATENTS

| | | |
|---|---|---|
| 2,755,742 | 7/1956 | Vincent. |
| 2,770,500 | 4/1957 | Jones. |
| 2,915,422 | 12/1959 | Stone. |
| 3,028,996 | 4/1962 | Ellett. |
| 3,218,659 | 11/1965 | Rowley _____ 15—109.6 |

FOREIGN PATENTS 650,762  10/1902  Canada.

M. CARY NELSON, Primary Examiner

R. J. MILLER, Assistant Examiner

U.S. Cl. X.R.

15—104.6